US012632279B2

(12) United States Patent
Patro et al.

(10) Patent No.: US 12,632,279 B2
(45) Date of Patent: May 19, 2026

(54) CROSS-PLATFORM VIRTUAL MACHINE MIGRATION

(71) Applicant: Microsoft Technology Licensing, LLC, Redmond, WA (US)

(72) Inventors: Rupesh Bhagaban Patro, Redmond, WA (US); Shivjit Satish Patil, Chapel Hill, NC (US); Aishwarya Srinivasa Raghavan, Sammamish, WA (US); Kenyon James Hensler, Acworth, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 615 days.

(21) Appl. No.: 18/066,887

(22) Filed: Dec. 15, 2022

(65) Prior Publication Data

US 2024/0202016 A1 Jun. 20, 2024

(51) Int. Cl.
*G06Q 10/06* (2023.01)
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
USPC .......................................................... 718/1
See application file for complete search history.

(56) References Cited

U.S. PATENT DOCUMENTS

| | | | | |
|---|---|---|---|---|
| 9,741,005 B1 * | 8/2017 | Adogla | ............... | G06Q 10/0635 |
| 2012/0311568 A1 * | 12/2012 | Jansen | ............... | G06F 9/45558 718/1 |
| 2013/0152076 A1 * | 6/2013 | Patel | ................... | G06F 9/45558 718/1 |
| 2017/0371696 A1 * | 12/2017 | Prziborowski | ...... | G06F 9/45558 |
| 2019/0266007 A1 * | 8/2019 | Tsirkin | ...................... | G06F 9/50 |
| 2022/0222100 A1 | 7/2022 | Srivastava | | |
| 2022/0321535 A1 * | 10/2022 | Sun | ...................... | H04L 61/103 |

OTHER PUBLICATIONS

International Search Report and Written Opinion received for PCT Application No. PCT/US23/036833, Mar. 14, 2024, 15 pages.

* cited by examiner

*Primary Examiner* — April Y Blair
*Assistant Examiner* — Ross Michael Vincent
(74) *Attorney, Agent, or Firm* — Alleman Hall LLP

(57) ABSTRACT

A distributed computing system including a migration domain having migration agents and virtual machines running on hypervisors, where the hypervisors span multiple independent distributed computing platforms. The migration domain is configured to (1) receive a request to migrate a virtual machine from a source hypervisor to a target hypervisor on a separate, independent distributed computing platform; (2) receive, once the virtual machine is active at the target hypervisor, virtual network parameters that were used by the virtual machine, pre-migration, to connect with a virtual network; and (3) communicate an updated virtual/physical association of the virtual network parameters to one or more other migration agents, enabling the migrated virtual machine to continue connectivity to the virtual network with the same virtual network parameters used at the source hypervisor.

19 Claims, 4 Drawing Sheets

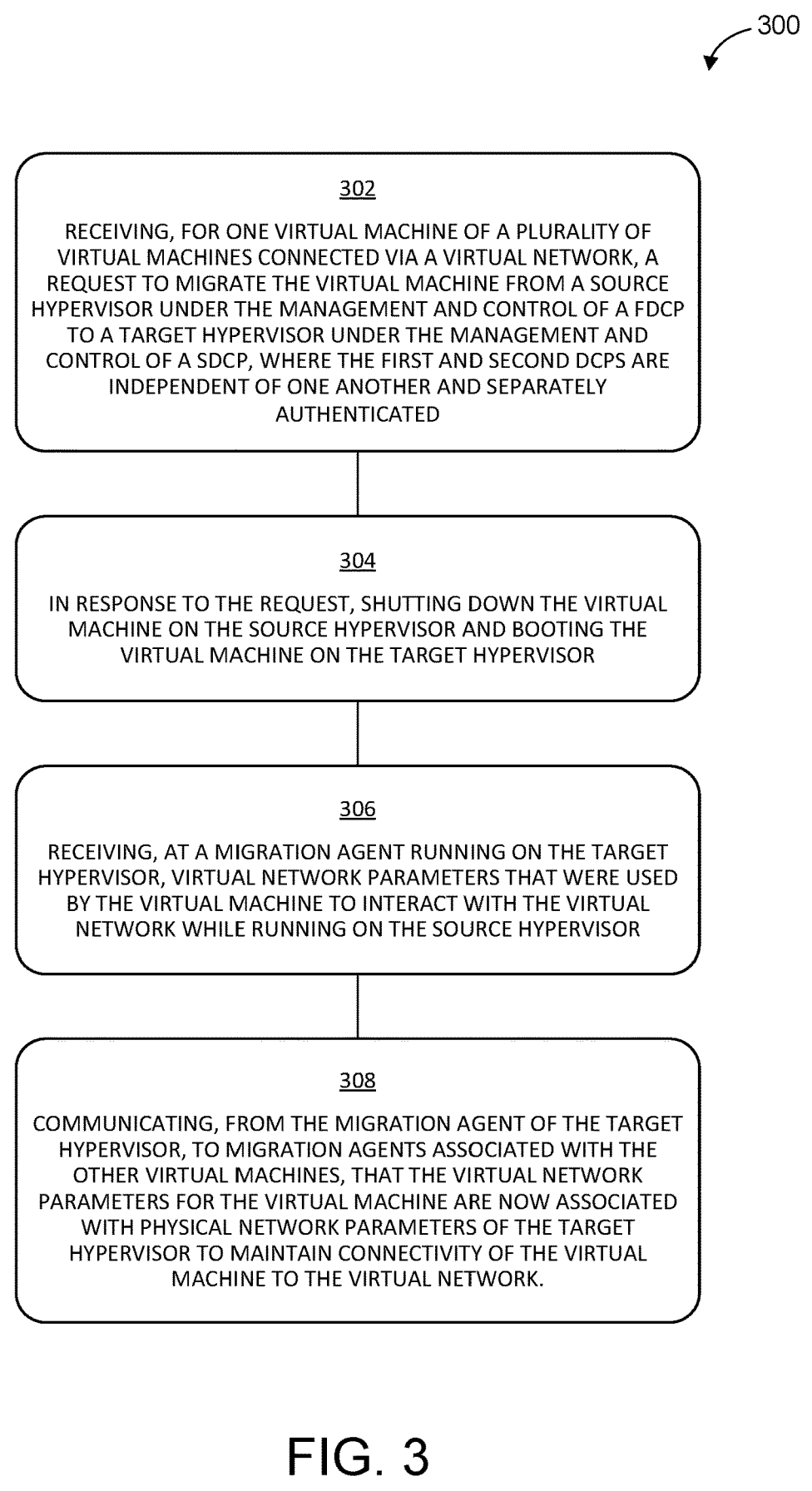

300

302

RECEIVING, FOR ONE VIRTUAL MACHINE OF A PLURALITY OF VIRTUAL MACHINES CONNECTED VIA A VIRTUAL NETWORK, A REQUEST TO MIGRATE THE VIRTUAL MACHINE FROM A SOURCE HYPERVISOR UNDER THE MANAGEMENT AND CONTROL OF A FDCP TO A TARGET HYPERVISOR UNDER THE MANAGEMENT AND CONTROL OF A SDCP, WHERE THE FIRST AND SECOND DCPS ARE INDEPENDENT OF ONE ANOTHER AND SEPARATELY AUTHENTICATED

304

IN RESPONSE TO THE REQUEST, SHUTTING DOWN THE VIRTUAL MACHINE ON THE SOURCE HYPERVISOR AND BOOTING THE VIRTUAL MACHINE ON THE TARGET HYPERVISOR

306

RECEIVING, AT A MIGRATION AGENT RUNNING ON THE TARGET HYPERVISOR, VIRTUAL NETWORK PARAMETERS THAT WERE USED BY THE VIRTUAL MACHINE TO INTERACT WITH THE VIRTUAL NETWORK WHILE RUNNING ON THE SOURCE HYPERVISOR

308

COMMUNICATING, FROM THE MIGRATION AGENT OF THE TARGET HYPERVISOR, TO MIGRATION AGENTS ASSOCIATED WITH THE OTHER VIRTUAL MACHINES, THAT THE VIRTUAL NETWORK PARAMETERS FOR THE VIRTUAL MACHINE ARE NOW ASSOCIATED WITH PHYSICAL NETWORK PARAMETERS OF THE TARGET HYPERVISOR TO MAINTAIN CONNECTIVITY OF THE VIRTUAL MACHINE TO THE VIRTUAL NETWORK.

FIG. 3

CROSS-PLATFORM VIRTUAL MACHINE MIGRATION

BACKGROUND

Cloud computing platforms are widely used to provide a host of benefits. Virtualization is employed extensively to provide flexibility, efficient use of resources, scalability, and responsiveness to changing business needs, among many other benefits. Computing platforms can host a vast array of virtualized resources and it is often desirable to reconfigure how they are deployed in relation to underlying physical resources. In particular, it is often desirable to migrate virtual machines from one hypervisor to another within a cloud platform.

SUMMARY

Disclosed is a distributed computing system having one or more first platform guest groups on a first distributed computing platform and one or more second platform guest groups on a second, independent and separately authenticated, distributed computing platform. Each guest group includes a migration domain and one or more virtual machines running on a hypervisor, the migration agents and virtual machines being included in a migration domain, and at least some of the virtual machines connected via a virtual network. The migration domain is configured to (1) receive a request to migrate a virtual machine from a source hypervisor in the first distributed computing platform to a target hypervisor in the second distributed computing platform; (2) migrate the virtual machine on the source hypervisor to the target hypervisor; (3) receive, at the migration agent of the target hypervisor, virtual network parameters that were used by the virtual machine to connect with the virtual network while running on the source hypervisor; and (4) communicate an updated association of the virtual network parameters to one or more other migration agents.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is an example method of migrating a virtual machine from one distributed computing platform to a second, independent, distributed computing platform.

DETAILED DESCRIPTION

Figure 1:
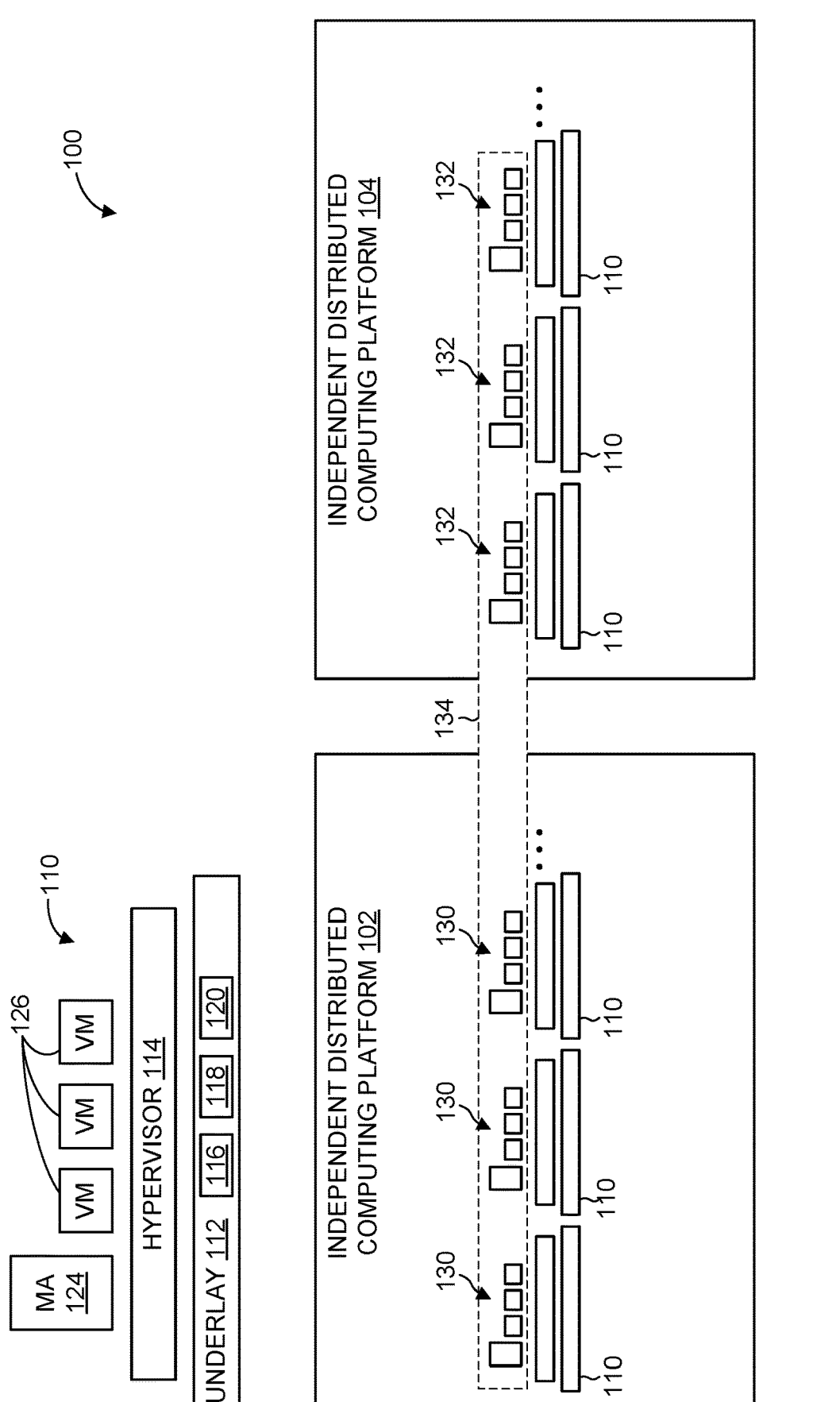
FIG. 1 is a schematic depiction of a system for migrating virtual machines between independent distributed computing platforms.

A distributed cloud platform can contain many physical compute nodes hosting large numbers of virtualized resources. Bare metal hosts and/or other substrates can provide tenancy to vast numbers of virtual machines via various configurations and deployments of hypervisors. In typical large-scale implementations, thousands and thousands of virtual machines can be connected in near-limitless network structures and topologies using virtualized networking architectures sitting on top of physical fabrics. These architectures can enable dynamic, programmatically-efficient network configurations to improve network performance and monitoring.

Various virtualization mechanisms can be employed with such networking architectures, and include virtualized components that touch physical networks at tunnel points. The connectivity of a virtual machine within a network employing virtualization in many cases involves an association of virtual network parameters of the virtual machine, such as an IP-MAC binding, with physical network parameters of hardware components that underlay the hypervisor of the virtual machine—e.g., NICs, switches, routers, etc.

Managers of virtual environments frequently find it useful to change virtual machine deployment. For a variety of reasons, it may be desirable to move a virtual machine from one hardware environment to another, for example by migrating a virtual machine from a source hypervisor to a target hypervisor. From the perspective of an administrator, it may be desirable to consolidate functionality in a particular location, or to distribute virtual machines across multiple locations to provide fault tolerance. Migration can better satisfy performance objectives, improve resource utilization and communication locality, mitigate performance hotspots, achieve fault tolerance, etc. For a given owner/operator, these migrations typically happen within an individual distributed computing platform that is already established as the home platform for the virtual machines, allowing the reconfiguration to happen without needing additional accounts, subscription, authentication, network configurations, complexity, etc., that would be required to spin up virtual machines at another independent cloud computing platform.

Nonetheless, the inventors have recognized that in some cases it will be desirable to provide a migration mechanism for moving virtual machines that is efficient and seamless even when the migration spans independent distributed computing platforms. As indicated above, migrating a virtual machine from one distributed computing platform to another can involve extra steps, complexity and disruption relative to staying within a home distributed computing platform. The owner/operator of the virtual machine fleet will typically need to establish accounts, obtain separate credentials/authentication, and perform added configuration tasks. Network configuration may be burdensome, with various challenges associated with having virtual machines at the new platform efficiently achieve connectivity to the various networks they were communicating with pre-migration.

Accordingly, various examples are disclosed for seamlessly migrating virtual machines from one distributed computing platform to another. The distributed computing platforms between which migration is contemplated are independent from one another. In this regard, "independent" means that the platforms are owned/operated by different entities, have different subscriber accounts/IDs, and/or are separately authenticated/authorized. Accordingly, migration of a virtual machine from one distributed computing platform to another involves variously overcoming these hurdles. Even when one or more threshold issues are addressed, such as establishing an account and presence at the second platform, it may still be difficult to seamlessly retain network connectivity when a virtual machine is migrated between independent platforms.

As will be described in detail below, in some examples, cross-platform migration can be coordinated by a plurality of migration agents which each run on a hypervisor along with one or more associated virtual machines on that same hypervisor. Some of the populated hypervisors are in a first distributed computing platform and some are in a second distributed computing platform, independent from the first. A request is received at one of the migration agents to cause migration of a virtual machine on its hypervisor (source hypervisor) to a target hypervisor, where such migration is cross-platform, i.e., from the first distributed computing platform to the second distributed computing platform or vice versa. The virtual machine is then migrated to the target hypervisor, for example by shutting down and booting at the target hypervisor, by live migration, or by any other mechanism that causes the virtual machine to commence operation at the new location. The transfer of the virtual machine file may be achieved in any suitable way, and from any suitable source.

Pre-migration, the virtual machine is connected via a virtual network to one or more other virtual machines, such as the virtual machines that co-reside on hypervisors with the migration agents. Indeed, as explained below, the virtual machines interconnected by the virtual network may all reside within a migration domain including multiple migration agents, each of which resides, along with one or more associated virtual machines, on an associated hypervisor. The migration agents may play various roles associated with supporting the virtual network connecting the virtual machines. In some examples, the migration agents function as tunnel endpoints for the virtual machines on their respective hypervisor, thus reflecting an association of the virtual network parameters of those virtual machines with the physical network parameters of the NIC or other hardware networking components that physically underlay the hypervisor. When virtual machines are migrated in accordance with the present examples, a communication is made that the virtual machine's virtual parameters are now associated with the physical network parameters of the target hypervisor—i.e., the migrated virtual machine has a new tunnel endpoint that can be captured/tracked in a routing table or like mechanism—enabling the migrated virtual machine to seamlessly continue interacting with the virtual network it was using pre-migration.

Referring now to FIG. 1, the figure depicts an example system 100 for enabling efficient migration of virtual machines between independent distributed computing platforms 102 and 104. Within each distributed computing platform are a plurality of virtualized computing systems 110, one of which is shown in enlarged form to the upper left of the figure. As seen in the enlarged view, virtualized computing system 110 includes underlay 112 which has various hardware resources managed by hypervisor 114. Such hardware resources can include processing logic 116, memory 118, NIC functionality 120 and any other suitable resources. Although hypervisor 114 is depicted as a "bare metal" configuration, this is non-limiting and the present discussion applies to hosted configurations and any other virtualization structure involving hypervisor-to-hypervisor migration of virtual machines.

Running on each hypervisor is a migration agent 124 and one or more virtual machines 126. On any given virtualized computing system, the migration agent 124 and virtual machines 126 on the hypervisor are referred to collectively as either first platform guest groups 130 (associated with platform 102) or second platform guest groups 132 (associated with platform 104). The platform guest groups (i.e., migration agents 124 and virtual machines 126) across both platforms define a migration domain 134.

As will be described, the migration domain performs various functions in connection with migrating virtual machines from source to target hypervisors 114. In general, the migration agents 124 coordinate migration of the virtual machines and confer with each other regarding the location of the virtual machines to facilitate transition and ensure seamless resumption of activity, particularly network activity, when virtual machines are relocated. Migration agents 124 in general are aware of the locations and movement of the virtual machines within the migration domain 134. This awareness includes maintenance and tracking of network parameters to facilitate the virtual machines maintaining IP-MAC bindings, even when migrating between independent platforms, to support seamless attachment to and interaction with virtual networks. Resumption of network interactivity in some cases can occur in a matter of seconds after migration of a virtual machine to a new independent platform.

Referring still to the continuity of network connection, migration agent 124 may, individually or in combination with NIC 120 or other underlay structures, form a tunnel endpoint that defines an interface between virtualized and physical networking mechanisms. When virtual machines 126 that reside on different hypervisors, whether in the same platform 102/104 or spanning the platforms, are connected via a virtual network, their connectivity to that network depends on their identity/address in the network. Accordingly, the network infrastructure that supports the virtual network of virtual machines maintains, for each virtual machine, an awareness of the tunnel endpoint for each virtual machine. In particular, awareness is needed of the association between physical network parameters associated with the hypervisor (e.g., tunnel endpoint) and virtual network parameters of the respective virtual machine (e.g., its IP-MAC binding). As described below, the present examples allow for seamless continuity of network connectivity by allowing a migrated virtual machine to continue using its virtual network parameters upon relocation to a new hypervisor, even when such migration spans independent distributed computing platforms.

Figure 2:
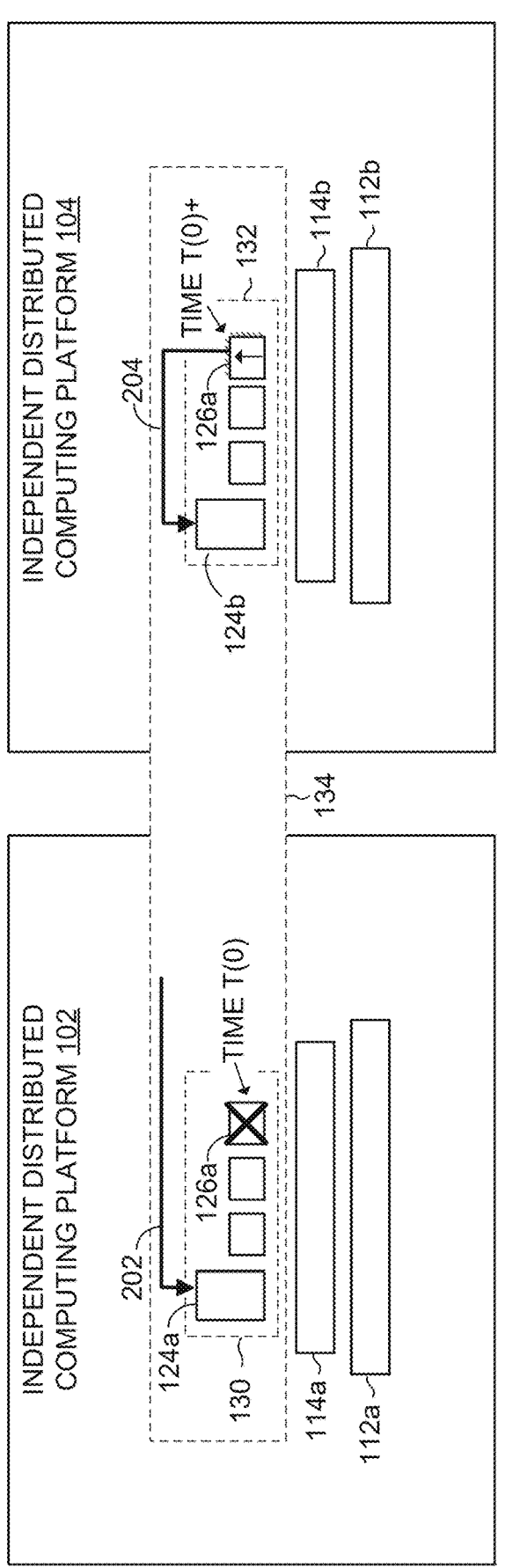
FIG. 2 is an example depiction of a scenario in which a virtual machine is migrated from one distributed computing platform to a second, independent, distributed computing platform.

FIG. 2 schematically depicts an example of migration of a virtual machine from one independent distributed computing platform to another (i.e., platform 102 to platform 104). The migration source is a source hypervisor 114a on underlay 112a associated with first platform guest group 130 to a target hypervisor 114b on underlay 112b associated with second platform guest group 132. As in the previous example, the guest groups and their migration agents and virtual machines define a migration domain 134 within which migrations and associated tracking and management occur. In the present example, migration agents 124a and 124b interact in connection with the cross-platform migration of virtual machine 126a from distributed computing platform 102 to distributed computing platform 104 and more specifically from source hypervisor 114a to target hypervisor 114b. Though not depicted, migration domain 134 may include any suitable number of additional migration agents, virtual machines, hypervisors, etc.

Prior to migration, virtual machine 126a is configured with virtual network parameters that enable it to communicate appropriately with other virtual machines on its network, for example a network established for a functional department of a corporation, educational institution or other entity. The virtual network parameters can include a virtual IP-MAC binding that enables the network functionality. In particular, the association of these virtual network parameters with a physical network parameter of source hypervisor 114a is known within the network, to enable virtual machine 126a to send and receive packets from its network—for example to other virtual machines and migration agents within domain 134. Coordinated activity of the migration agents and/or migration domain can control the routing activity of messages from virtual machines on the virtual network.

Referring still to FIG. 2, in the present example a migration request 202 is received within the migration domain 134. In this specific example, the request is received at migration agent 124a, which is on the same hypervisor as the virtual machine 126a targeted by the request. In other examples, the request is received other than at the migration agent of the to-be-migrated virtual machine, such as at another migration agent. In any event, at time T(0), virtual machine 126a is shut down on source hypervisor 114a. At a later time T(0)+, which in some cases is a few seconds or less from shutdown, virtual machine 126a boots on target hypervisor 114b on the other, independent platform 104. Once the virtual machine 126a is booted on the target hypervisor 114b, it supplies virtual network parameters to the local migration agent 124b, as indicated at 204. In other examples, the virtual network parameters are otherwise supplied to the local migration agent 124b. Alternately, as referenced above, the virtual machine may spin up at the target location via a live migration which may not necessarily include a formal shut down at the source hypervisor.

It will be appreciated that, post-migration, virtual machine 126a has a new tunnel point, in that it now "sits behind" migration agent 124b, hypervisor 114b, and underlay 112b. Accordingly, the system then entails a communication that is propagated, e.g., through the virtual network the virtual machine 126a was attached to pre-migration, that its virtual network parameters (e.g., its IP-MAC binding) are now associated with the physical network parameters associated with the one or more aspects of the new tunnel point. In some examples, the migration agents connected with the virtual network collectively track this updated virtual-physical association (e.g., in a routing table), allowing the virtual machine to retain its IP-MAC binding and seamlessly remain connected to the virtual network in the same manner as when connected to the source hypervisor.

The request 202 received to migrate a virtual machine migration (e.g., migration request 202) may take different forms and arise in different ways. Typically, the request will identify an address where the virtual machine is to be relocated—e.g., identify a particular target hypervisor. The target hypervisor may be chosen based on a variety of considerations, such as load balancing, available capacity, compute resources at the source or destination, risk factors associated with source and candidate target locations, communication locality, etc.

In some cases, policy logic is executed on one or more of the virtual machines in the migration domain to control migration of virtual machines within the migration domain. Such policy logic can reflect any prescription for when and how to migrate virtual machines, including destinations for migration. Migration considerations can include load balancing, performance considerations, redundancy needs and mechanisms, improved resource utilization, etc. Policy logic in some cases can be employed in contemplation of disruptive events that might be experienced at a particular platform, such as natural disasters, broad-scale malfunctions, major infrastructure events, etc. This policy logic can employ variable response strategies depending on the nature of the event. Virtual machine migration strategies can be employed to provide data recovery, backup storage locations, backup service locations, downtime avoidance, sustained performance, etc. Each of these objectives can be mapped to one or more plans for migrating specific virtual machines to specific target hypervisors.

In some cases, in addition to or instead of a migration request, migration from one independent platform to another is triggered by detecting a migration condition. Such a condition may be detected in connection with one of the platform guest groups, i.e., the migration agent and/or virtual machines running on a particular hypervisor in the platform. In response to detecting that condition, the migration domain can cause the virtual machine to be migrated from a source hypervisor to a target hypervisor, which in some cases can be a cross-platform migration. As previously described, such migration can include a retention of virtual network parameters for the migrated virtual machine, so those virtual network parameters can be used post-migration to connect to a virtual network used by the virtual machine pre-migration.

Regarding the migration condition, one example is a detected communication state of the virtual machine. This can include any communication state relevant to relocation of a virtual machine, for example not detecting expected responses to communications, or not receiving any response, which might suggest a problem with the hypervisor. In these cases, recovery policies might indicate booting the virtual machine on another hypervisor, which may be on a separate, independent distributed computing platform. Another migration condition can include a performance state of the virtual machine, such as slow response, overheating, dropped packets, strain indication, etc.

Referring now to FIG. 3, a method 300 is depicted for migrating virtual machines between distributed computing platforms that are independent of one another. At 302, the method includes receiving, for one virtual machine of a plurality of virtual machines connected via a virtual network, a request to migrate the virtual machine from a source hypervisor under the management and control of a first distributed computing platform to a target hypervisor under the management and control of a second distributed computing platform. The first and second distributed computing platforms are independent of one another and separately authenticated. As discussed in other examples, the virtual machine to be migrated has virtual network parameters that establish its identity and location on a virtual network so that it can communicate via the virtual network. Referring to FIGS. 1 and 2, the virtual machine may be part of a migration domain and on the same network as other virtual machines within that migration domain. The IP-MAC address binding of the virtual machine (virtual network parameter) is associated with physical network parameter of its hypervisor, and the combination of these parameters enables network connectivity of the virtual machines.

At 304, in response to the request, the method includes shutting down the virtual machine on the source hypervisor and booting the virtual machine on the target hypervisor. This may be achieved in any suitable way. For example, referring to FIG. 1, a virtual machine image may be transmitted from a migration agent 124 on the source hypervisor to a migration agent on the target hypervisor. The migration of step 304 may alternatively be achieved via a live migration or any other mechanism that causes the virtual machine to spin up at the target/destination hypervisor.

At 306, the method includes receiving, at a migration agent running on the target hypervisor, virtual network parameters that were used by the virtual machine to interact with the virtual network while running on the source hypervisor. As indicated above, this in many cases will include the IP-MAC binding that the migrating virtual machines was using when running on the source hypervisor.

At 308, the method includes communicating, from the migration agent of the target hypervisor, to migration agents associated with the other virtual machines, that the virtual network parameters for the virtual machine are now associated with physical network parameters of the target hypervisor to maintain connectivity of the virtual machine to the virtual network. This step updates the ecosystem so that all of the relevant actors are aware of the update, namely the link between the virtual network parameters of the migrated virtual machine (IP-MAC binding) to the physical network parameters of the target hypervisor. This enables the virtual machine to retain its network identity and seamlessly resume network activity despite having migrated to a new and independent distributed computing platform. In some implementations, the above addressing update involves the new tunnel endpoint (at the destination hypervisor) announcing that it has the IP address of the migrated VM. In turn, at an appropriate time, the source hypervisor announces to the relevant network actors that it no longer has the IP address.

As in the prior examples, the virtual machine being migrated in method 300 may be, pre-migration, on a virtual network including any number of migration agents and virtual machines, such as those depicted in FIG. 1. In some examples, the migration agents include or access routing tables or other mechanisms that enable appropriate routing of messages within the network. For the virtual machines, such address tables/mechanisms include tracking an association between IP-MAC bindings for the virtual machines in the network. Accordingly, the post-migration activity of steps 306 and 306 may include a collective update, at all the relevant migration agents connected to the virtual network, that the migrated virtual machine is still using the same IP-MAC binding, but that it is now associated with different physical network parameters—i.e., those that are being used by its source hypervisor to connect to various physical network components. In this and other examples, it will be appreciated that other migration agents need not be directly informed of the changed association of virtual network parameters for the migrated virtual machine. Any approach may be employed, so long as the relevant routing tables or like mechanisms are updated to enable the migrated virtual machine to seamlessly continue interconnectivity with its pre-existing IP-MAC binding. In some cases, the "communication" to other migration agents of the updated virtual/physical association includes causing that association to be received at a networking component that another migration agent uses to enable the virtual machines on its hypervisor to connect with the migrated virtual machine.

From the above, it will be appreciated that the described systems and methods enable enhanced flexibility for how virtual machines are migrated. Migration can be effected in a coordinated manner by migration agents that can be controlled in an agile manner with mechanisms and policies that determine when and how virtual machines are to be migrated. In many migration scenarios, it will be desirable to effect a significant migration of virtual assets, i.e., to a completely independent distributed computing platform. This may facilitate testing, provide for greater distribution and redundancy, improve/modify locality of assets, support business strategy, and/or avoid impacts of disruptive events.

Figure 4:
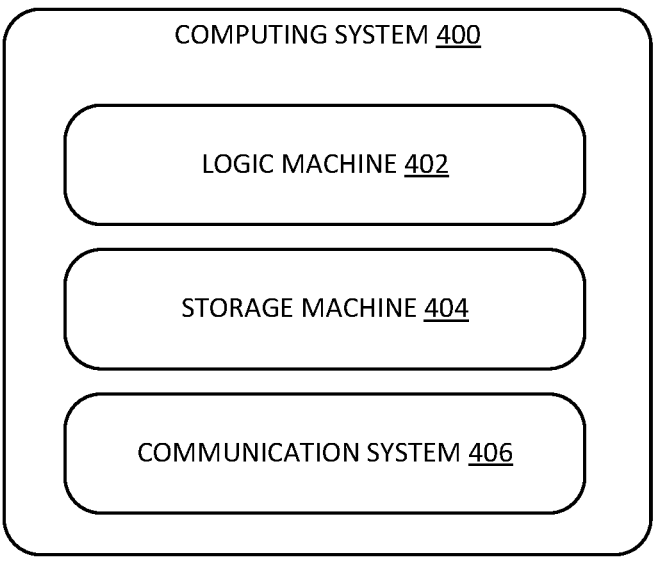
FIG. 4 is an exemplary computing system depicting exemplary physical and/or virtualized components configured to facilitate cross-platform virtual machine migration.

In some embodiments, the methods and processes described herein may be tied to a computing system of one or more computing devices. To the extent that the following description is directed to non-virtualized resources, it will be appreciated that these resources may be managed by a hypervisor or otherwise virtualized. FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic machine 402 and a storage machine 404 and communication subsystem 406. Computing system may optionally also include a display subsystem, and/or other components not shown in FIG. 4. Logic machine 402, storage machine 404 and communication subsystem may correspond to respective components of underlay 112 (FIG. 1) in some cases. In other cases, the descriptions of these components can apply to virtualized features sitting on top of and managed by hypervisors 114.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices. Aspects of storage machine may be virtualized, for example as a memory managed by a hypervisor and provisioned to a guest virtual machine.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, a display subsystem may be used to present a visual representation of data held by storage machine 404. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more display devices utilizing virtually any type of technology. Such display devices may be combined with logic machine 402 and/or storage machine 404 in a shared enclosure, or such display devices may be peripheral display devices.

When included, an input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Communication subsystem 406 may be configured to communicatively couple computing system 400 with one or more other computing devices. Communication subsystem 406 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet. As variously described above, communication system may reflect or make use of a combination of virtual and physical networking components, for example in connection with a tunnel endpoint when virtual and physical network components meet.

In a first example, a distributed computing system is disclosed, comprising: (1) one or more first platform guest groups, each comprising one or more virtual machines and a migration agent running on a hypervisor, where the hypervisors of the first platform guest groups are on a first distributed computing platform; (2) one or more second platform guest groups, each comprising one or more virtual machines and a migration agent running on a hypervisor, where the hypervisors of the second platform guest groups are on a second distributed computing platform, the first and second distributed computing platforms being independent and separately authenticated, where at least some of the virtual machines are connected via a virtual network; and (3) a migration domain including the migration agents and virtual machines of the first and second guest platform groups. The migration domain is configured to: (a) receive a request to migrate a virtual machine from a source hypervisor of one of the first platform guest groups to a target hypervisor of one of the second platform guest groups, (b) in response to such request, migrate virtual machine on the source hypervisor to the target hypervisor, (c) receive, at the migration agent of the target hypervisor, virtual network parameters that were used by the virtual machine to connect with the virtual network while running on the source hypervisor, and (d) communicate, from the migration agent of the target hypervisor to one or more of the other migration agents, that the virtual network parameters for the virtual machine are now associated with physical network parameters of the target hypervisor instead of those of the source hypervisor.

The above-referenced migration agents may be virtual machines running on their respective hypervisors. The above-referenced request may specify the target hypervisor as a destination for the migration of the virtual machine. The above-referenced request may be received at the migration agent on the source hypervisor. The above-referenced virtual network parameters received at the migration agent of the target hypervisor may include an IP-MAC binding of the virtual machine. The above-referenced virtual network parameters may be received at the migration agent and provided from the virtual machine after the virtual machine is booted on the target hypervisor. In the above example, for each of the migration agents, the migration agent may provide a tunnel end point for the virtual machines on the migration agent's hypervisor. In the above example, the migration domain may be configured so that the migration agents track, as virtual machines connected with the virtual network migrate between the first and second distributed computing platforms without changing their virtual network parameters, that those virtual network parameters are now associated with physical network parameters of destination hypervisors to which the virtual machines have migrated. In the above-referenced example, policy logic may be configured to execute on one or more migration agents of the migration domain, such policy logic being configured to control (1) when virtual machines of the migration domain are to be migrated, and (2) to which hypervisors within the migration domain such virtual machines are to be migrated. In the above-referenced example, the migration domain may be configured to, in response to detecting a migration condition associated with a virtual machine on a source hypervisor of one of the first platform guest groups, (1) cause migration of that virtual machine from the source hypervisor to a target hypervisor of one of the second platform guest groups, and (2) cause such virtual machine to retain virtual network parameters used by the virtual machine to connect with the virtual network while on the source hypervisor to be retained and used by the virtual machine to connect with the virtual network while on the target hypervisor. The migration condition may be a communication state of the virtual machine. The migration condition is a performance state of the virtual machine.

Another example provides for a method of migrating virtual machines, including (1) receiving, for one virtual machine of a plurality of virtual machines connected via a virtual network, a request to migrate the virtual machine from a source hypervisor on a first distributed computing platform to a target hypervisor on a second distributed computing platform, where the first and second distributed computing platforms are independent and separately authenticated; (2) in response to the request, migrating virtual machine on the source hypervisor to the target hypervisor; (3) receiving, at a migration agent running on the target hypervisor, virtual network parameters that were used by the virtual machine to connect with the virtual network while running on the source hypervisor; and (4) communicating, from the migration agent of the target hypervisor, to migration agents associated with the other virtual machines, that the virtual network parameters for the virtual machine are now associated with physical network parameters of the target hypervisor to maintain connectivity of the virtual machine to the virtual network.

The above method example may further include, for a second virtual machine of the plurality of virtual machines, detecting a migration condition associated with the second virtual machine, and in response to such detection, migrating the second virtual machines from a source hypervisor on the first distributed computing platform to a target hypervisor on the second distributed computing platform, and where virtual network parameters used by the second virtual machine to connect to the virtual network while on the source hypervisor are retained and used by the second virtual machine to connect with the virtual network while on the target hypervisor. The migration condition may be a communication state of the second virtual machine. The migration condition may be a performance state of the second virtual machine.

In the above example method, virtual network parameters may be received at the migration agent and provided from the virtual machine after the virtual machine is booted on the target hypervisor. The virtual network parameters received at the migration agent of the target hypervisor may be a virtual IP-MAC address binding of the virtual machine being migrated. In the above example method, the request may specify the target hypervisor as a destination for the migration of the virtual machine.

A distributed computing system is provided in a third example, comprising: (1) a plurality of first platform guest groups, each comprising one or more virtual machines and a migration agent running on a hypervisor, where the hypervisors of the first platform guest groups are on a first distributed computing platform; (2) a plurality of second platform guest groups, each comprising one or more virtual machines and a migration agent running on a hypervisor, where the hypervisors of the second platform guest groups are on a second distributed computing platform, the first and second distributed computing platforms being independent and separately authenticated, where at least some of the virtual machines are connected via a virtual network; and (3) a migration domain including the migration agents and virtual machines of the first and second guest platform groups, the migration domain being configured to: (a) route network traffic to and from the virtual network for a virtual machine while such virtual machine is on a source hypervisor of one of the first platform guest groups, such routing being achieved using a virtual IP-MAC binding for the virtual machine; (b) receive, at the migration agent on the source hypervisor, a request to migrate the virtual machine from the source hypervisor to a target hypervisor of one of the second platform guest groups; (c) in response to such request, migrate the virtual machine on the source hypervisor to the target hypervisor; (d) receive, at the migration agent of the target hypervisor, the virtual IP-MAC binding; (e) communicate from the migration agent of the target hypervisor to one or more of the other migration agents, that the virtual IP-MAC binding is now associated with physical network parameters of the target hypervisor instead of those of the source hypervisor; and (f) route network traffic to and from the virtual network for the virtual machine while such virtual machine is on the target hypervisor, such routing being achieved using the same virtual IP-MAC binding. It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A distributed computing system, comprising:
one or more first platform guest groups, each comprising one or more virtual machines and a migration agent running on a hypervisor, where each migration agent of the first platform guest groups provides a tunnel endpoint for the virtual machines running on the hypervisor of that migration agent and where the hypervisors of the first platform guest groups are on a first distributed computing platform;
one or more second platform guest groups, each comprising one or more virtual machines and a migration agent running on a hypervisor, where each migration agent of the second platform guest groups provides a tunnel endpoint for the virtual machines running on the hypervisor of that migration agent, where the hypervisors of the second platform guest groups are on a second distributed computing platform, the first and second distributed computing platforms being independent and separately authenticated, and where at least some of the virtual machines of the first platform guest groups are connected via a virtual network; and
a migration domain including the migration agents and virtual machines of the first and second guest platform groups, the migration domain being configured to:

receive a request to migrate a virtual machine connected to the virtual network from a source hypervisor of one of the first platform guest groups to a target hypervisor of one of the second platform guest groups, in response to the request, migrate the virtual machine from the source hypervisor to the target hypervisor, receive, at the migration agent of the target hypervisor, virtual network parameters that were used by the virtual machine to connect with the virtual network while running on the source hypervisor, and communicate, from the migration agent of the target hypervisor to one or more of the other migration agents, that the virtual network parameters for the virtual machine are now associated with physical network parameters of the target hypervisor identifying the tunnel endpoint of the migration agent of the target hypervisor instead of physical network parameters of the source hypervisor, such that network traffic of the virtual network addressed to the virtual network parameters for the virtual machine passes through the tunnel endpoint of the target hypervisor.

2. The distributed computing system of claim 1, where the migration agents are virtual machines running on their respective hypervisors.

3. The distributed computing system of claim 1, where the request specifies the target hypervisor as a destination for the migration of the virtual machine.

4. The distributed computing system of claim 1, where the request is received at the migration agent on the source hypervisor.

5. The distributed computing system of claim 1, where the virtual network parameters received at the migration agent of the target hypervisor include an IP-MAC binding of the virtual machine.

6. The distributed computing system of claim 1, where the virtual network parameters are received at the migration agent of the target hypervisor and provided from the virtual machine after the virtual machine is booted on the target hypervisor.

7. The distributed computing system of claim 1, where the migration domain is configured so that the migration agents track, as virtual machines connected with the virtual network migrate between the first and second distributed computing platforms without changing their virtual network parameters, that those virtual network parameters are now associated with physical network parameters of destination hypervisors to which the virtual machines have migrated.

8. The distributed computing system of claim 1, further comprising policy logic configured to execute on one or more migration agents of the migration domain, such policy logic configured to control (1) when virtual machines of the migration domain are to be migrated, and (2) to which hypervisors within the migration domain such virtual machines are to be migrated.

9. The distributed computing system of claim 1, where the migration domain is configured to, in response to detecting a migration condition associated with a virtual machine on a source hypervisor of one of the first platform guest groups, (1) cause migration of that virtual machine from the source hypervisor to a target hypervisor of one of the second platform guest groups, and (2) cause such virtual machine to retain virtual network parameters used by the virtual machine to connect with the virtual network while on the source hypervisor to be retained and used by the virtual machine to connect with the virtual network while on the target hypervisor.

10. The distributed computing system of claim 9, where the migration condition is a communication state of the virtual machine.

11. The distributed computing system of claim 9, where the migration condition is a performance state of the virtual machine.

12. A method for migrating virtual machines, comprising:
receiving, for one virtual machine of a plurality of virtual machines connected via a virtual network, a request to migrate the virtual machine from a source hypervisor on a first distributed computing platform to a target hypervisor on a second distributed computing platform, where the first and second distributed computing platforms are independent and separately authenticated;

in response to the request, migrating the virtual machine from the source hypervisor to the target hypervisor;

receiving, at a migration agent running on the target hypervisor, wherein the migration agent provides a tunnel endpoint for virtual machines running on the target hypervisor, virtual network parameters that were used by the virtual machine to connect with the virtual network while running on the source hypervisor; and communicating, from the migration agent of the target hypervisor to migration agents associated with other virtual machines connected to the virtual network, that the virtual network parameters for the virtual machine are now associated with physical network parameters of the target hypervisor identifying the tunnel endpoint of the migration agent of the target hypervisor instead of physical network parameters of the source hypervisor, such that network traffic of the virtual network addressed to the virtual network parameters for the virtual machine passes through the tunnel endpoint of the target hypervisor and connectivity of the virtual machine to the virtual network is maintained.

13. The method of claim 12, further comprising, for a second virtual machine of the plurality of virtual machines, detecting a migration condition associated with the second virtual machine, and in response to such detection, migrating the second virtual machines from a source hypervisor on the first distributed computing platform to a target hypervisor on the second distributed computing platform, and where virtual network parameters used by the second virtual machine to connect to the virtual network while on the source hypervisor are retained and used by the second virtual machine to connect with the virtual network while on the target hypervisor.

14. The method of claim 13, where the migration condition is a communication state of the second virtual machine.

15. The method of claim 13, where the migration condition is a performance state of the second virtual machine.

16. The method of claim 12, where the virtual network parameters are received at the migration agent and provided from the virtual machine after the virtual machine is booted on the target hypervisor.

17. The method of claim 12 where the virtual network parameters are a virtual IP-MAC address binding of the virtual machine being migrated.

18. The method of claim 12, where the request specifies the target hypervisor as a destination for the migration of the virtual machine.

19. A distributed computing system, comprising:

a plurality of first platform guest groups, each comprising one or more virtual machines and a migration agent running on a hypervisor, where each migration agent of the first platform guest groups provides a tunnel endpoint for the virtual machines running on the hypervisor of that migration agent and where the hypervisors of the first platform guest groups are on a first distributed computing platform;

a plurality of second platform guest groups, each comprising one or more virtual machines and a migration agent running on a hypervisor, where each migration agent of the second platform guest groups provides a tunnel endpoint for the virtual machines running on the hypervisor of that migration agent, where the hypervisors of the second platform guest groups are on a second distributed computing platform, the first and second distributed computing platforms being independent and separately authenticated, and where at least some of the virtual machines are connected via a virtual network; and a migration domain including the migration agents and virtual machines of the first and second guest platform groups, the migration domain being configured to:

route network traffic to and from the virtual network for a virtual machine connected to the virtual network while such virtual machine is on a source hypervisor of one of the first platform guest groups, such routing being achieved using a virtual IP-MAC binding for the virtual machine;

receive, at the migration agent on the source hypervisor, a request to migrate the virtual machine from the source hypervisor to a target hypervisor of one of the second platform guest groups;

in response to the request, migrate the virtual machine from the source hypervisor to the target hypervisor receive, at the migration agent of the target hypervisor, the virtual IP-MAC binding;

communicate from the migration agent of the target hypervisor to one or more of the other migration agents, that the virtual IP-MAC binding is now associated with physical network parameters of the target hypervisor identifying the tunnel endpoint of the migration agent of the target hypervisor instead of physical network parameters of the source hypervisor; and route network traffic to and from the virtual network for the virtual machine while such virtual machine is on the target hypervisor, such that network traffic of the virtual network addressed to the virtual IP-MAC binding for the virtual machine passes through the tunnel endpoint of the target hypervisor, such routing being achieved using the same virtual IP-MAC binding.

* * * * *